UNITED STATES PATENT OFFICE.

MAX MANDT AND ROBERT HOLDMANN, OF LUDWIGSHAFEN-ON-THE-RHINE, GERMANY, ASSIGNORS TO THE BADISCHE ANILIN AND SODA FABRIK, OF SAME PLACE.

PROCESS OF OXIDIZING ORTHONITROTOLUENE.

SPECIFICATION forming part of Letters Patent No. 650,332, dated May 22, 1900.

Application filed February 6, 1900. Serial No. 4,267. (No specimens.)

*To all whom it may concern:*

Be it known that we, MAX MANDT, doctor of philosophy, and ROBERT HOLDMANN, subjects of the King of Bavaria, residing at Ludwigshafen-on-the-Rhine, in the Kingdom of Bavaria and Empire of Germany, have invented new and useful Improvements in Processes for the Oxidation of Orthonitrotoluene, of which the following is a specification.

It is known that certain methyl derivatives of benzene can be oxidized in the side chain by means of manganese peroxid in acid solution and so converted into corresponding aldehyde compounds. (See the specification of the German Patent No. 101,221.) According to the said specification the formation of carboxylic acid is almost entirely prevented when a large excess of the methyl derivative is present during the reaction. Further, although toluene, xylene, and the like are readily oxidized the oxidation of ortho-nitro-toluene proceeds with difficulty under the conditions therein described. Thus if ortho-nitro-toluene be treated according to the conditions described in the Examples 1 and 2 of the said specification—that is to say, at a temperature of 40° or 25° centigrade, respectively—only traces of ortho-nitro-benzaldehyde are formed, if any. We have found that under suitable conditions, hereinafter set forth, the oxidation of ortho-nitro-toluene in the side chain can be very readily effected with the aid of manganese peroxid and sulfuric acid. If the conditions be suitably chosen, ortho-nitro-benzaldehyde or the corresponding carboxylic acid can be obtained as desired, even though an excess of ortho-nitro-toluene be present. The conditions to be observed are that the temperature must be essentially higher—over 100° centigrade—and the concentration of the sulfuric acid must be varied according to the object it is desired to effect. If dilute acid be used, ortho-nitro-benzaldehyde is the product obtained, while with stronger acids ortho-nitrobenzoic acid is the principal product. It is recommended that the treatment be effected in closed vessels, so that the mass can be heated above the boiling-point under ordinary pressure and the desired temperature of reaction be obtained. When working with stronger acids, an arrangement should be made to neutralize the effect of the water formed, diluting the sulfuric acid—namely, by adding during the reaction more concentrated acid. The vessel in which the reaction is effected is preferably lined with lead and furnished with a stirrer and a manometer, and it should be provided with a valve which, while maintaining the desired pressure, permits the escape of the reaction gases if the pressure rises higher than is desirable.

The following examples will serve to illustrate the manner in which our invention can be carried into practical effect, (the parts are by weight:)

*Example 1—Production of ortho-nitro-benzaldehyde as main product.*—Mix together one hundred (100) parts of ortho-nitro-toluene, one thousand (1,000) parts of dilute sulfuric acid, (containing from thirty-five to forty-eight per cent. $H_2SO_4$,) and two hundred (200) parts of finely-powdered manganese peroxid. Introduce the mixture into a vessel capable of withstanding pressure, arranged as hereinbefore stated, and heat for about two or three hours at a temperature of about 140° to 165° centigrade. Adjust the valve of the vessel so that a pressure of about ten atmospheres is not exceeded. When the reaction is finished, allow the mixture to stand, so that any manganese peroxid in suspension may settle. Collect the oil which floats upon the acid liquid and wash it with water and with a solution of carbonate of soda. This treatment withdraws any ortho-nitro-benzoic acid that may have been formed as a by-product. Shake the oil after this treatment with sodium bisulfite in the cold. The ortho-nitro-benzaldehyde dissolves and can be separated and obtained in a nearly-pure condition by the addition of alkalies.

*Example 2—Production of ortho-nitro-benzoic acid as main product.*—Prepare a mixture of the same ingredients as those set forth in Example 1, except that stronger acid is to be taken—namely, acid containing from sixty-two to seventy-eight per cent. of $H_2SO_4$. Heat the mixture in the pressure vessels preferably only to a temperature of 135° to 145° centigrade. Adjust the safety-valve so that the gas formed during the reaction can escape if the pressure rises too high. When working in this way, on treating the oil that results in the manner described in Example 1 a large quantity of ortho-nitro-benzoic acid is obtained, while a small quantity of ortho-nitro-benzaldehyde is mixed with it as a by-product. It is not absolutely necessary to work in closed vessels under pressure. Similar results can be obtained when working at ordinary pressure, using a vessel provided with an inverted condenser; but when working in this way concentrated sulfuric acid is added during the reaction to maintain the strength of the acid in spite of the formation of water during the reaction.

Now what we claim is—

1. The process of making ortho-nitro-benzaldehyde and ortho-nitro-benzoic acid by the oxidation of ortho-nitro-toluene in the side chain by treatment with dilute sulfuric acid and manganese peroxid at an elevated temperature substantially as described.

2. The process of making ortho-nitro-benzaldehyde and ortho-nitro-benzoic acid by the oxidation of ortho-nitro-toluene by treatment with dilute sulfuric acid containing about thirty-five to forty-eight per cent. $H_2SO_4$ and manganese peroxid at a temperature of 140° to 165° centigrade at a pressure not exceeding ten atmospheres substantially as described.

3. The process of making ortho-nitro-benzoic acid and ortho-nitro-benzaldehyde by the oxidation of ortho-nitro-toluene by treatment with dilute sulfuric acid containing about sixty-two to seventy-eight per cent. $H_2SO_4$ and manganese peroxid at a temperature of about 135° to 145° centigrade substantially as described.

4. The process of making an ortho-nitro derivative which consists in the oxidation of ortho-nitro-toluene in the side chain by treatment with sulfuric acid and manganese peroxid at a temperature above 100° centigrade, substantially as described.

In testimony whereof we have hereunto set our hands in the presence of two subscribing witnesses.

MAX MANDT.
ROBERT HOLDMANN.

Witnesses:
ERNEST E. EHRHARDT,
JACOB ADRIAN.